US012747806B2

(12) United States Patent
Horner

(10) Patent No.: US 12,747,806 B2
(45) Date of Patent: Sep. 29, 2026

(54) SAFETY VALVE

(71) Applicant: HAM-LET [ISRAEL-CANADA] LTD., Nof Hagalil (IL)

(72) Inventor: Gal Horner, Nof Hagalil (IL)

(73) Assignee: HAM-LET [ISRAEL-CANADA] LTD., Nof Hagalil (IL)

( * ) Notice: Subject to any disclaimer, the term of this patent is extended or adjusted under 35 U.S.C. 154(b) by 221 days.

(21) Appl. No.: 18/579,152

(22) PCT Filed: Jun. 27, 2022

(86) PCT No.: PCT/IL2022/050689
§ 371 (c)(1),
(2) Date: Jan. 12, 2024

(87) PCT Pub. No.: WO2023/286045
PCT Pub. Date: Jan. 19, 2023

(65) Prior Publication Data

US 2024/0318741 A1 Sep. 26, 2024

(30) Foreign Application Priority Data

Jul. 12, 2021 (IL) ........................................ 284806

(51) Int. Cl.

| | |
|---|---|
| ***F16K 31/143*** | (2006.01) |
| ***F16K 7/17*** | (2006.01) |
| ***F16K 35/00*** | (2006.01) |

(52) U.S. Cl.
CPC .............. *F16K 31/143* (2013.01); *F16K 7/17* (2013.01); *F16K 35/00* (2013.01)

(58) Field of Classification Search
CPC . F16K 7/16; F16K 7/17; F16K 31/145; F16K 31/143; F16K 35/00; F16K 35/02; F16K 35/04; Y10T 137/7256
(Continued)

(56) References Cited

U.S. PATENT DOCUMENTS

| | | |
|---|---|---|
| 3,101,924 A | 8/1963 | Berck |
| 3,429,321 A | 2/1969 | Walter |

(Continued)

FOREIGN PATENT DOCUMENTS

| | | |
|---|---|---|
| IL | 165393 | 11/2004 |
| JP | 2005-090737 A | 4/2005 |

(Continued)

OTHER PUBLICATIONS

International Search Report dated Oct. 4, 2022, issued by the U.S. Patent and Trademark Office in corresponding application PCT/IL2022/050689.

(Continued)

*Primary Examiner* — Kenneth Rinehart
*Assistant Examiner* — Jonathan J. Waddy
(74) *Attorney, Agent, or Firm* — Stein IP, LLC

(57) ABSTRACT

A normally closed valve comprising: a seat that has a fluid inlet and a fluid outlet; a diaphragm, an external handle and an internal safety mechanism operationally coupled to the external handle and the diaphragm. The valve allows forcing the handle in a first direction, thereby moving the internal safety mechanism through at least a first and subsequently a second stage. During the first stage: the diaphragm is pressed onto the seat, flow of pressurized air through the internal safety mechanism is blocked, and air pent in the valve is vented, causing the valve to be and remain in a closed state. During the second stage: flow of pressurized air through the internal safety mechanism is allowed, the pressurized air after passing therethrough, acting against the pressing of the diaphragm onto the seat; and a venting of air is reduced, causing the valve to be and remain in an open state.

6 Claims, 6 Drawing Sheets

(58) Field of Classification Search
USPC .................................... 251/14, 331; 137/385
See application file for complete search history.

(56) References Cited

U.S. PATENT DOCUMENTS

| | | | | |
|---|---|---|---|---|
| 5,287,889 | A * | 2/1994 | Leinen .................. | F16K 47/045 137/625.3 |
| 7,131,629 | B2 | 11/2006 | Iwabuchi et al. ............ | 251/63.5 |
| 7,802,771 | B2 | 9/2010 | Tsubota et al. .............. | 251/63.5 |
| 10,054,246 | B2 | 8/2018 | Lizuka et al. | |
| 10,240,623 | B2 | 3/2019 | Renollett et al. | |
| 2005/0000570 | A1 * | 1/2005 | Mohammed .......... | F16K 27/003 251/14 |
| 2005/0121634 | A1 * | 6/2005 | Iwabuchi .................. | F16K 7/17 251/63.4 |
| 2005/0253100 | A1 * | 11/2005 | Yasue ....................... | F16K 7/17 251/63 |
| 2009/0184272 | A1 | 7/2009 | Nesbitt ........................... | 251/58 |
| 2022/0275871 | A1 * | 9/2022 | Ishibashi ............. | F16K 31/1221 |

FOREIGN PATENT DOCUMENTS

| | | | |
|---|---|---|---|
| JP | 2005-163979 | A | 6/2005 |
| JP | 4261282 | B2 * | 4/2009 |
| JP | 2020-153491 | A | 9/2020 |

OTHER PUBLICATIONS

Extended European Search Report mailed Oct. 10, 2024, issued to European Patent Application No. 22841606.1.
European Intention to Grant mailed Nov. 3, 2025, issued to European Patent Application No. 22841606.1.
Notice of Reasons for Refusal mailed Feb. 6, 2025, issued to Japanese Patent Application No. 2024-501878.
First Office Action mailed Jul. 14, 2025, issued to Korean Patent Application No. 10-2024-7004627.
Second Office Action mailed Jan. 2, 2026, issued to Korean Patent Application No. 10-2024-7004627.

* cited by examiner

SAFETY VALVE

CROSS-REFERENCE TO RELATED APPLICATIONS

This application is a national stage of International Application No. PCT/IL2022/050689, filed Jun. 27, 2022, which claims the benefit of Israeli Application No. 284806, filed Jul. 12, 2021, in the Israel Patent Office, the disclosures of which are incorporated herein by reference.

BACKGROUND

There is a reliance on control devices such as valves where the flow of gases and liquids through pipework needs regulating. These valves and gases/liquids [generally referred to as process fluids] find a wide range of applications in processes including bulk chemical manufacturing, oil refining and the pharmaceutical and semiconductor industries. Similar valves, albeit generally on a smaller scale, are used in research, and even in domestic plumbing and heating systems in car engines, for example.

An air-operated valve is a device that uses compressed air to control or modulate the flow of media such as process fluid through a pipework.

The media that flows through the valve ports may be gas, which can often be hazardous and toxic.

Often, particularly where inflammable, highly toxic or otherwise dangerous substances are used, the air-operated valves must have a fail-safe, and it is critical to ensure that they may be locked in the fully closed position such that flow cannot be restarted inadvertently, such as by a mechanical vibration or by accidental or unauthorized human intervention, for example. This may be achieved by using lockable valves. If the valve is air-to-open (ATO) then it will fail closed (FC), also known as normally closed (NC); while if the valve is designed to be air-to-close (ATC) then it will fail open (FO).

Some valves include padlocks or the like, to lock the valve handle in either fully open or fully closed positions. The locking may hinder tampering and unauthorized manipulation of the valves but if the valve requires servicing or another manual manipulation the valve is unlocked and is susceptible to inadvertent switching from open to close or close to open. In addition, the locking does not help if the closing/opening themselves malfunction, for example due to failure to vent air trapped in the valve, or failure to completely stop flow of pressurized air into the valve, each of which might open the valve or keep it open when intended to be closed.

Hence there is still a need for an internal safety feature preventing an inadvertent change in status of the valve and ensuring that the valve is and remains in a desired state, by providing a mechanism that allows for simultaneous manual mechanical closing of a NC valve while blocking and venting of the pressurized air used to keep the valve open. The following described invention addresses this issue in a safe and reliable manner.

SUMMARY

The present invention provides a mechanism and valve capable of preventing inadvertent opening of a closed valve.

The valve and mechanism may also be capable of preventing inadvertent closing of the valve when the valve is intended to be in an open state.

Such capability may also include the valve being configured to simultaneously allow all of the following: internally locking the valve with mechanical means, blocking the air supply used for pneumatically operating the valve, and venting the valve [all together closing the valve], for example all by a single manual manipulation of the valve in a first direction.

"Locking the valve with mechanical means" refers to transmitting force via a chain of components in physical contact with each other such as to lock the valve.

In addition, such capability may also include the valve being configured to simultaneously allow all the following: mechanically internally unlocking the valve, connecting the air supply used for pneumatically operating the valve, and reducing or eliminating venting of the valve [all together opening the valve], for example all by a single manual manipulation of the valve in a second direction which may be opposite to the first direction.

The valve may be further configured to allow preventing inadvertent opening of a closed valve by allowing the valve to remain closed over a limited range of motion in manipulation of the valve in the second direction.

The valve may be further configured to allow preventing inadvertent closing of an opened valve by allowing the valve to remain open over a limited range of motion in manipulation of the valve in the first direction.

The valve may be even further configured to allow manual locking of the valve, for example by locking an external valve handle with a lock, the locking including preventing said manipulation of the valve.

According to another aspect, a method and valve are provided whereby a single rotation of an external handle carries out the before mentioned functions. In a preferred embodiment the described mechanism can be applied [retrofitted] to many different designs of presently available, on the market, pneumatically operated valves, optionally through minor design adjustments and scaling of both the mechanism and valve.

According to another aspect the mechanism comprises:

- a control shaft which has a lower control shaft duct, and which is rotatable by means of manipulating an external handle with respect to an internal axis, and
- a stationary threaded stopper which has a stopper duct, and a disable mechanism disposed therein.

The disable mechanism includes a disable mechanism duct extending from the stopper duct to outside the stopper.

The control shaft and the threaded stopper may be urged together by resilient means.

The valve is open when the lower duct and the disable mechanism duct are aligned. Compressed air can pass from the disable mechanism duct to the lower duct. The compressed air passing through the lower duct, may for example force a spring away from pressing on a diaphragm that lies on a seat that has process fluid inlet and outlet, thus allowing the process fluid to pass via the valve.

Manipulating the handle, thereby rotating the control shaft, may cause several things to simultaneously and synergistically occur:

1. the lower duct becomes misaligned with the disable mechanism duct; the compressed air cannot pass from the disable mechanism duct to the lower duct.
2. due to the structure of the stopper, the manipulation of the handle may cause the control shaft and the stopper to be forced apart, thereby creating a gap therebetween; air pent in the lower duct can thus vent via the gap.
3. the control shaft whilst rotating by the manipulation of the handle, also moves down [parallel to the axis of rotation], and consequently mechanically closes the valve [e.g., pushes down a diaphragm].

These actions work together to close the valve.

In some embodiments, supplied pressurized air travels through the handle positioner, continues through an upper duct of the control shaft, into a stopper duct of the threaded stopper and subsequently into a pneumatic disable mechanism having a disable mechanism duct passing therethrough. Thereafter the pressurized air may continue back into the lower duct of the control shaft extending to outside the control shaft, and throughout to a main body of the valve, if the lower duct and the disable mechanism duct are aligned, or is blocked when the lower duct and the disable mechanism duct are not aligned.

The spring below the control shaft holds the bearing spheres sitting within designated grooves of the control shaft and the sloped channel of the threaded stopper by keeping the control shaft and the threaded stopper together. The bearing spheres and angled groove are configured to create an internal locking mechanism of the system, preventing unwanted rotation of the control shaft. The angled grooves are split up into 3 sections. The first and last sections are perpendicular to the axis of rotation while the middle segment is sloped, the size of the angles of the three sections varies in different embodiments. This custom design creates a degree of safety in the perpendicular regions of the groove in which the rotation of the control shaft in either direction, opening and closing, will not cause the system to change from its enabled or disabled position.

The above summary merely explains major principles of structure and operation of the novel valve and method of operation and use. The summary should not be considered to limit the claimed invention, the scope of the invention should only be determined by the scope of the claims.

During the description below, the following terms are used to describe the embodiments:

- Essentially sealing refers to a situation in which a negligible amount of internal air escapes into the environment.
- The status of the system refers to the valve's state being open or closed. An open state means that a process fluid can flow through the valve, and a closed state means that the flow of the process fluid is essentially blocked.
- Pneumatic means refer to devices and systems that provide pressurized air to the disclosed valve.

According to one aspect, a normally closed valve is provided comprising:

- a seat that has a fluid inlet and a fluid outlet;
- a diaphragm, an external handle and an internal safety mechanism operationally coupled to the external handle and the diaphragm;

wherein the valve is configured to allow forcing the handle in a first direction, thereby moving the internal safety mechanism through at least a first and subsequently a second stage;

- wherein
- during the first stage:
  - the diaphragm is pressed onto the seat,
  - flow of pressurized air through the internal safety mechanism is blocked, and
  - air pent in the valve is vented,
  - causing the valve to be and remain in a closed state;
- during the second stage:
  - flow of pressurized air through the internal safety mechanism is allowed, the pressurized air after passing therethrough, acting against the pressing of the diaphragm onto the seat, and a venting of air is reduced,
  - causing the valve to be and remain in an open state.

In some embodiments the valve is further configured to allow forcing the handle in a second direction opposite to the first direction, thereby moving the internal safety mechanism through at least the second stage and subsequently the first stage.

In some embodiments the valve is further configured to allow moving the internal safety mechanism through an intermediary stage.

In some preferred embodiments during the intermediary stage, the valve is in a closed state. Some embodiments further comprise a piston mechanically coupling the internal safety mechanism to the diaphragm; wherein during the first stage the internal safety mechanism pushes the piston against the diaphragm.

In some embodiments the internal safety mechanism comprises:

- a pneumatic disable mechanism, a control shaft, and a series of ducts extending through the disable mechanism and the control shaft;
- wherein the moving of the internal safety mechanism comprises moving the control shaft relative to the disable mechanism;
- during the second stage the series of ducts is aligned.

In some embodiments the internal safety mechanism further comprises:

- resilient means for urging the disable mechanism against the control shaft.

In some embodiments the internal safety mechanism further comprises:

- sealing means for sealing in between the disable mechanism and the control shaft.

Some embodiments further comprise

- a threaded stopper, the stopper comprising a stopper duct and a housing chamber, the stopper duct extending through a wall of the housing chamber and being a member of the ducts series;
  - wherein the disable mechanism is situated within the housing chamber;
- the disable mechanism comprising:
  - a disable shaft comprising a disable mechanism duct;
  - a disable spring for urging the disable shaft against the control shaft, and at least one O-ring for sealing in between the disable mechanism duct and the control shaft duct when the disable mechanism duct and the control shaft duct are aligned.

In some embodiments, the threaded stopper further comprises;

- at least one groove, each comprising a first region and a second region;

the internal safety mechanism comprising at least one bearing sphere, each held on the control shaft and situated in one of the at least one groove;

wherein turning the external handle causes the at least one bearing sphere to travel along the at least one groove;

when the at least one bearing sphere is in the first region the internal safety mechanism is moving through the first stage and when the at least one bearing sphere is in the second region the internal safety mechanism is moving through the second stage.

In some embodiments at least one groove further comprises an intermediary region; when the at least one bearing sphere is in the intermediary region the internal safety mechanism is moving through the intermediary stage.

BRIEF DESCRIPTION OF THE FIGURES

For a better understanding of the invention and to show how it may be carried into effect, reference will now be made, by way of example, to the accompanying drawings in which one embodiment of the present invention is shown, thereby making apparent to those both skilled and unskilled in the art how the invention may be embodied in practice. It is stressed that the particulars shown are by way of example and for purposes of illustrative discussion only and are presented in the cause of providing what is believed to be the most useful and readily understood description of the principles and conceptual aspects of the invention. In this regard, no attempt is made to show structural details in more detail than is necessary for a fundamental understanding thereof. In the accompanying drawings.

DETAILED DESCRIPTION

Figure 1:
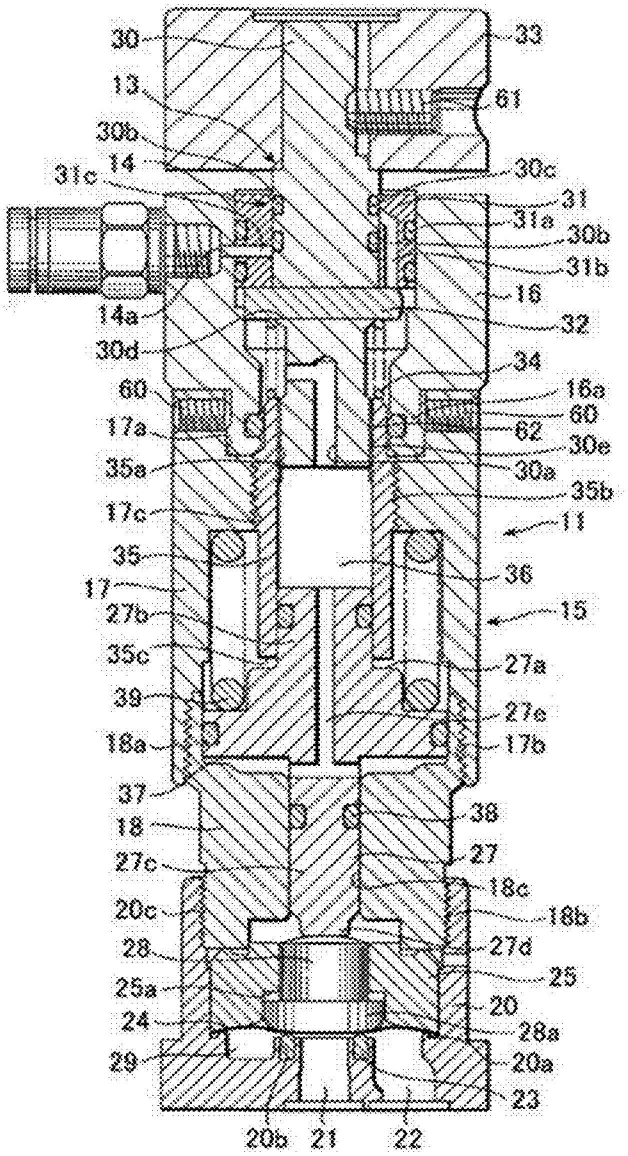
Prior Art Figure 1
FIG. 1 is a vertical cross-sectional view, showing a prior art automatic-and-manual operation composite valve.

FIG. 1 is a vertical cross-sectional view of a prior art composite valve, in which a valve body includes a diaphragm, "valve body" 24. The valve is in a "closed" state, as the diaphragm 24 is in closed state:

According to the state of the diaphragm 24 the upstream flow path 22 and the downstream flow path 21 are connected or disconnected.

A slide body 28 is urged towards the diaphragm 24 and thereby pushing the diaphragm 24 down against a valve seat 23.

In a valve main body 11, a spring 39, having a snapping force for snapping a piston 27 in a direction of closing the diaphragm 24, is attached between an intermediate casing 17 and the piston 27 and normally energizes the piston 27 elastically to maintain a closed state of the diaphragm 24.

The piston 27 slides in a direction apart from the diaphragm 24 in response to supplied operation air passing through the through hole 30*a* of a stem 30 and supplied into and discharged from a first air chamber 36 in the valve main body 11 to enable the valve to be opened and closed.

The valve has a manual operation-mechanism portion 13 which includes a manual operation handle 33, a stem 30 and a pair of O-rings 30*b* attached to the outer periphery of the stem 30. Pressing operation of the manual operation handle 33 allows purging the operation air within the valve main body 11.

The composite valve supplies the operation air to one side of the piston 27 provided within the valve main body 11 to allow the piston 27 to move upward, thereby disconnecting the diaphragm 24 from the valve seat 23, and utilizing the pressing operation of the manual operation mechanism portion 13 to close the air switch valve and purge the operation air within the valve main body 11.

A casing 15 includes an upper casing 16, an intermediate casing 17 and a lower casing 18. An annular protruding portion 16*a* of the upper casing 16 is fastened and firmly fixed to an annular recess portion 17*a* of the intermediate casing 17 with a locking screw 60 in a state in which the annular protruding portion 16*a* is fitted to the annular recess portion 17*a*. On the other hand, the intermediate casing 17 and the lower casing 18 are firmly fixed to each other by screw engagement between a female thread 17*b* formed in the intermediate casing 17 and a male thread 18*a* formed on the lower casing 18. Further, a base 20 is firmly fixed by screw engagement between a female thread portion 20*c* of the base 20 and a male thread portion 18*b* formed on a lower portion of the lower casing 18.

An outer peripheral thread structure is formed, including a pressing member 35 and a male thread 18*a*. This structure enables the pressing member 35 to be moved upwards and downwards with respect to the intermediate casing 17 when rotating the pressing member 35. The pressing member 35 is moved in an axial direction within the valve main body 11 to press the piston 27 against a lower end portion 35*c* of the pressing member 35.

The operation handle 33 shown in FIG. 1 is in an open state in which the operation air can be supplied and exhausted and in a state in which the opening and closing operation of the diaphragm 24 can be executed with the air switch valve portion 14. In cases in which the manual operation handle 33 is in a closed state, the air switch valve portion 14 provided within the valve main body 11 stops supplying the operation air to the valve main body 11 via the manual operation mechanism portion 13.

In FIG. 1, when pressing the manual operation handle 33 downward, the stem 30 connected to the manual operation handle 33 slides with respect to the annular member 31 fitted to the upper casing 16. At this time, the air supply port 14*a* is sealed by the O-ring 30*b* attached to the stem 30, whereby it is possible to forcibly stop supplying the operation air to the manual operation mechanism portion 13. Furthermore, at this time, since the purge hole 31*b* which has been sealed by the O-ring 30*b* before operating the manual operation handle 33 is communicated with the ambient air, the operation air stored in the valve main body 11, such as in the through hole 30*a* of the stem 30, is discharged through a purge hole 31*b*. Further, when the rotating operation of the manual operation handle 33 in the pressed state is executed, the pressing member 35 is going to rotate because the stem 30 and the pressing member 35 are coupled by means of the connection portion 62.

We now turn to describing some of our embodiments that provide solutions to important yet apparently previously unappreciated safety problems. Our embodiments share some common features with the prior art device described above but have additional uniquely designed features such as solving problems of inadvertent opening/closing of a valve.

Figure 2:
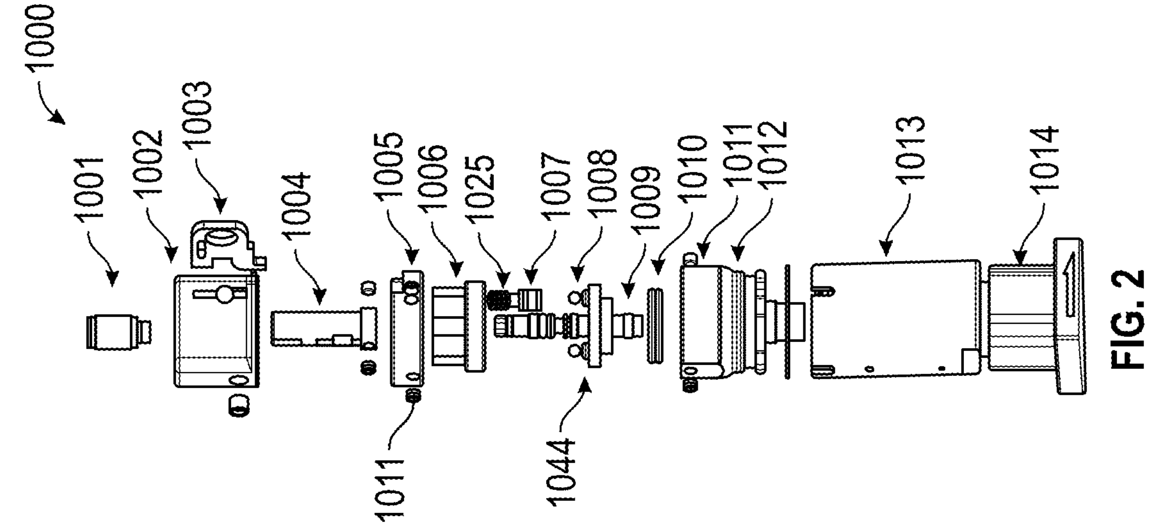
FIG. 2 is a depiction of the assembly for one embodiment of a novel normally closed pneumatically actuated valve, illustrating some major mechanism parts.

FIG. 2 is an exploded view showing the assembly of a normally closed pneumatically actuated valve embodiment 1000 with position locking capability.

Figure 3:
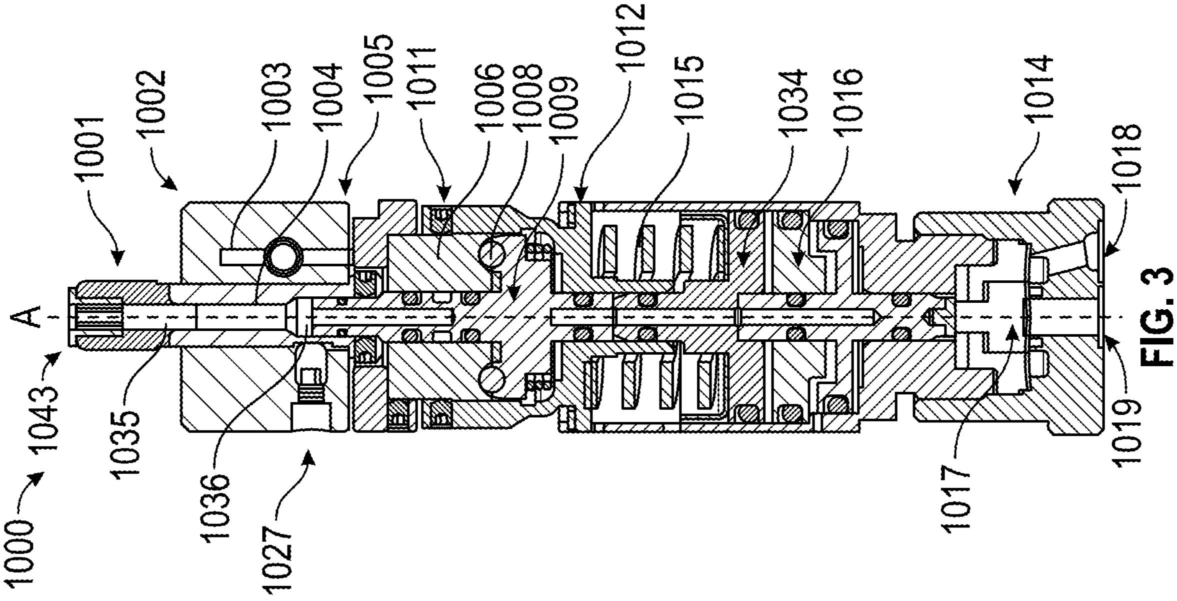
FIG. 3 is a depiction of one embodiment, assembled into a normally closed pneumatically actuated valve, in the disabled position.

FIG. 3 illustrates a cross sectional view of the assembled embodiment 1000 in a disabled position.

The valve 1000 comprises a diaphragm 1017. When the diaphragm 1017 is pressed down the valve is mechanically closed, and when the diaphragm 1017 is not pressed down the valve is mechanically open, similar to the prior art valve described above.

The valve 1000 further comprises an external handle 1002, an external latch 1003, a threaded stopper 1006, a pneumatic disable mechanism 1007, a control shaft 1009, a series of ducts 1043, an upper guide 1012, an actuator 1013 and a body 1014. The parts are assembled and held in place with locking bolts 1011, and first spring 1010, second spring 1025 and third spring 1015 or other resilient means. The relationship and interaction between these and other components are described hereinbelow.

Figure 4A:
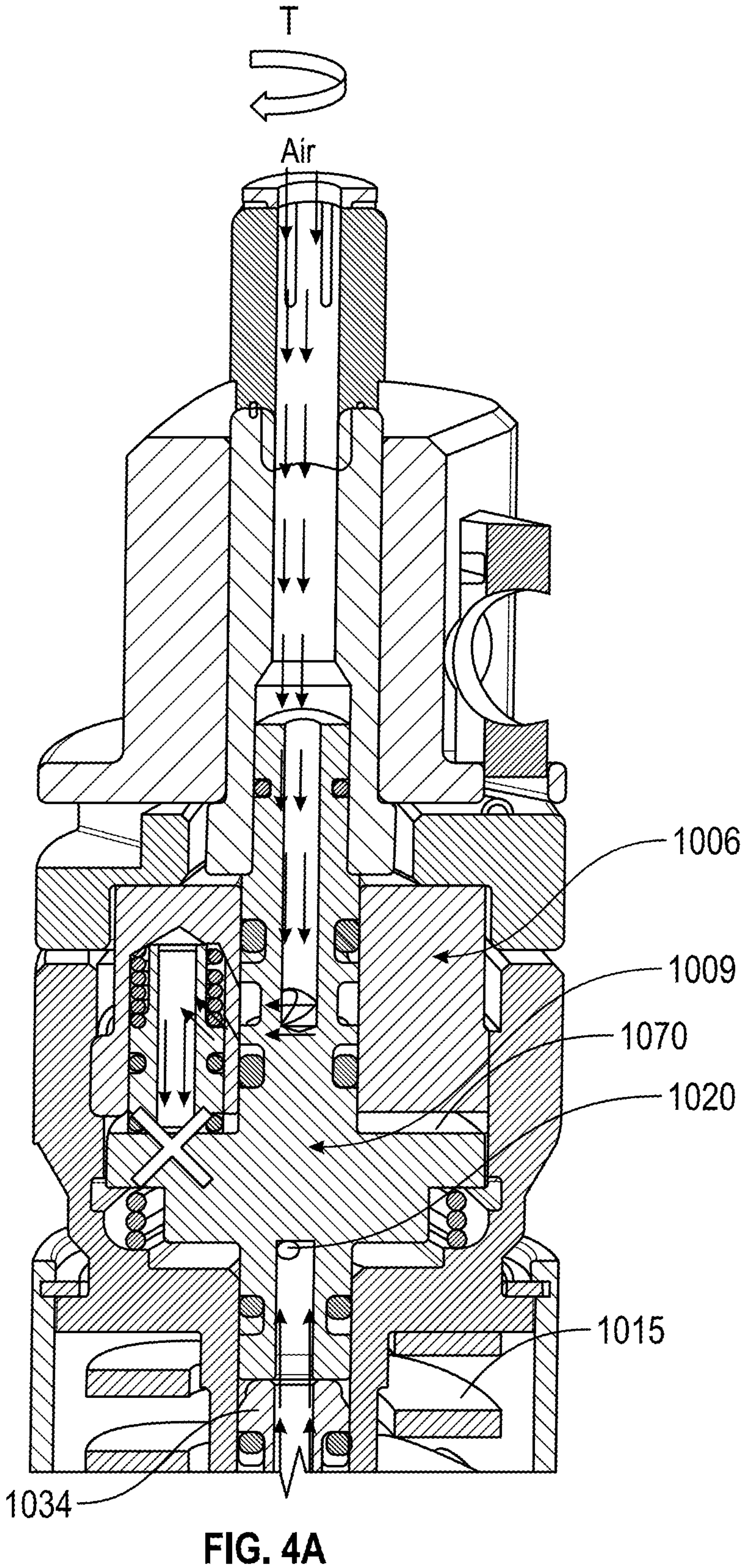
FIG. 4A is an illustration of a closed, disabled pneumatically actuated valve.
Figure 4B:
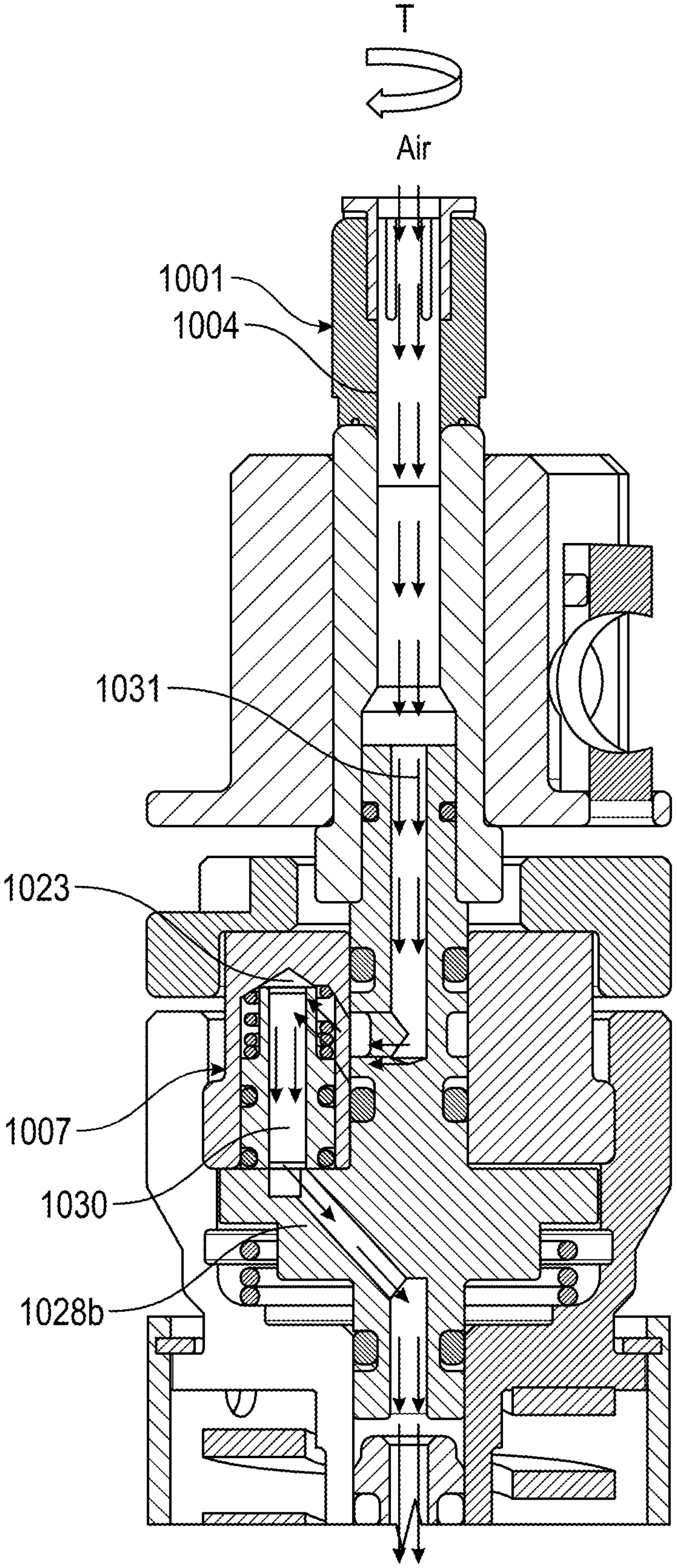
FIG. 4B is an illustration of the flow of air through a pneumatically actuated valve in its enabled state—the valve is open.

According to one aspect, a normally closed valve 1000 which may be opened by pneumatic means [providing pressurized air, see "air" in FIGS. 4A, 4B] is provided. The valve 1000 includes:

- a seat 1016 that has a fluid inlet 1018 and a fluid outlet 1019;
- a diaphragm 1017, an external handle 1002 and an internal safety mechanism 1044 operationally coupled to the external handle 1002 and the diaphragm 1017.

The internal safety mechanism 1044 is shown in a first stage in FIG. 4A and in a second stage in FIG. 4B.

The valve is configured to allow forcing the handle 1002 in a first direction (arrow T), thereby moving the internal safety mechanism 1044 through at least a first and subsequently a second stage;

wherein:

- during the first stage a disabling of the flow of pressurized air to the diaphragm 1017, and a releasing of pressured air from within the valve 1000 to the environment occur, causing the diaphragm 1017 and the valve 1000 to be and remain in a closed state.
- during the second stage, the diaphragm 1017 and valve 1000 are in open states: there is a flow of pressurized air via pneumatic means through the internal safety mechanism 1044, causing the diaphragm 1017 to transition to open state.

By the valve being in "closed state" we mean that a process fluid is essentially stopped from passing through the valve, by the diaphragm being in "closed state" we mean that the diaphragm is sufficiently pressed down to block passage of the process fluid through the valve. By the valve being in the "open state" we mean that a process fluid is essentially able to pass through the valve [body]. By the diaphragm being in "open state" we mean that the diaphragm is not sufficiently pushed down to block the passage of the process fluid.

The first stage and the second stage are not discrete points, i.e., the handle is substantially turned along a range within each stage, e.g., over a range of 20°, without any change to the state of the valve.

In some embodiments the valve 1000 is further configured to allow forcing the handle 1002 in a second direction opposite to the first direction T, thereby moving the internal safety mechanism 1007 through at least the second and subsequently first stage.

1 The valve 1000, as illustrated in FIG. 3, includes a hollow control shaft 1009 rotatably mounted on a piston 1034 (FIG. 4A). The piston 1034 is mechanically coupling the internal safety mechanism to the diaphragm; wherein during the first stage the internal safety mechanism pushes the piston 1034 against the diaphragm.

The hollow control shaft 1009 is engaged with the hollow handle positioner 1004. The pneumatic disable mechanism 1007 and the control shaft 1009 cooperate to allow: a) stopping the supply of the pressurized air to the control shaft 1009 and discharging the air from within the ducts series 1043 into the environment by manually rotating the control shaft 1009 about axis A. b) supplying the pressurized air to the control shaft, which can then push up the third spring 1015 that urges down the diaphragm 1017, and not discharging the air from within the ducts series 1043 to the environment. Without this release there might be an unwanted opening of the diaphragm 1017 possibly releasing hazardous material.

In some embodiments the valve is further configured to allow the internal safety mechanism 1044 to go through a third stage that is intermediary between the first stage and the second stage. The valve 1000 may be further configured to allow forcing the handle 1002 in a second direction opposite to the first direction, T, thereby moving the internal safety mechanism 1044 through the second stage, subsequently the intermediary stage and subsequently the first stage, and similarly the handle 1002 can be forced in the first direction, the internal safety mechanism 1044 going through the first stage, the intermediate stage and then the second stage.

During the intermediate stage, the control shaft 1009 is being rotated and in preferred embodiments diaphragm 1017 and valve 1000 are in closed states: there is no flow of pressurized air via the pneumatic means through the internal safety mechanism 1044, causing the diaphragm 1017 to remain in the closed state.

In some embodiments the internal safety mechanism 1044 comprises:

- a pneumatic disable mechanism 1007, a control shaft 1009, and a series of ducts 1043 comprising a disable mechanism duct 1045 and a lower control shaft duct 1028*b;*
- wherein the moving of the internal safety mechanism 1044 comprises moving the control shaft 1009 relative to the disable mechanism 1007;
- the disable mechanism 1007 and the control shaft 1009 are positioned such that during the first stage the disable mechanism duct 1045 and the lower control shaft duct 1028*b* are aligned and thus the series of ducts 1043 are aligned.

The internal safety mechanism 1044 in some embodiments further comprises:

- First spring 1010 and second spring 1025 for urging against each other the pneumatic disable mechanism 1007 and the control shaft 1009, such that when the disable mechanism duct 1045 and the lower control shaft duct 1028*b* are aligned, leakage of pressurized air from between the disable mechanism duct 1045 and the lower control shaft duct 1028*b*, if any, does not prevent opening the diaphragm 1017.

The internal safety mechanism 1044 in some embodiments further comprises:

sealing means such as O-rings 1024 for sealing [reducing/eliminating leakage of pressurized air from] in between the disable mechanism duct 1045 and the lower control shaft duct 1028*b* when the disable mechanism duct 1045 and the lower control shaft duct 1028*b* are aligned.

In some embodiments the valve further comprises a threaded stopper 1006, the stopper 1006 comprising a stopper duct 1029 (FIG. 8B) and a housing chamber 1023 (FIGS. 8A, 8B), the stopper duct 1029 extending through a wall 1030 of the housing chamber 1023 and being a member of the ducts series 1043 [FIG. 3];

wherein the pneumatic disable mechanism 1007 is situated within the housing chamber 1023;

the disable mechanism 1007 comprising:

a disable shaft 1050 (Figure SB) comprising the disable mechanism duct 1045;

first spring/resilient means 1010, and second spring/resilient means 1025 for urging together the disable shaft 1050 and the control shaft 1009, and sealing means 1024 for sealing in between the disable mechanism duct 1045 and the lower control shaft duct 1028*b* when the disable mechanism duct 1045 and the lower control shaft duct 1028*b* are aligned.

In some embodiments the threaded stopper 1006 further comprises:

at least one groove 1022, each comprising a first region 1062 and a second region 1066;

the internal safety mechanism 1044 comprising at least one bearing sphere 1008, each held on the control shaft 1009 and situated in at least one groove 1022;

wherein turning the external handle 1002 causes at least one bearing sphere 1008 to slide along at least one groove 1022;

when the at least one bearing sphere 1008 is in the first region 1062 the internal safety mechanism 1044 is moving through the first stage and when the at least one bearing sphere 1008 is in the second region 1066 the internal safety mechanism 1044 is moving through the second stage;

wherein the first stage relates to turning the external handle 1002 through angle θ about an axis A proportionate in size to a length 1063 of the first region 1062, and the second stage relates to turning the external handle 1002 through angle β proportionate in size to a length 1067 of the second region 1066.

In some embodiments at least one groove 1022 further comprises an -intermediary region 1064;

When the at least one bearing sphere 1008 is in the intermediary region 1064 the internal safety mechanism 1044 is moving through the intermediate stage;

wherein the intermediate stage relates to turning the external handle 1002 through angle α proportionate in size to a length 1065 of the intermediary region 1064.

The first and second regions 1062, 1066 are essentially coplanar and perpendicular to the rotation of axis A. Consequently, movement of the bearing spheres 1008 along the regions 1062, 1066 does not change the position of the control shaft 1009 in the direction of axis A. This feature is further explained below.

The handle positioner 1004 is housed inside of the handle 1002 and is directly connected to the air fitting inlet 1001 on a first end 1035 and on a second end 1036 to the control shaft 1009. The control shaft 1009 is vertically held in place and urged upwards by the first compression spring 1010, allowing the shaft 1009 to rotate around a central axis A. The control shaft 1009 has an ability of linear small length movements along the direction of the central axis A; not directly due to the movement of the handle 1002, which may be able to move only in a direction perpendicular to the rotation axis A, but rather due to the movement of the shaft 1009 relative to a threaded stopper 1006, as will be explained below.

The control shaft 1009 can be rotated about axis A with two bearing spheres 1008 below a threaded stopper 1006 along two sloped grooves 1022 (FIG. 8A) to ensure a smooth and directed movement acting as a bearing.

In the case of preventing flow of pressurized air to the closed diaphragm 1017, due to the misalignment of the ducts series 1043, turning of the handle 1002 about the axis A through the first and intermediary stages causes the diaphragm 1017 to remain in its closed status. The third stage of turning the handle 1002 about the axis A aligns the ducts series 1043, allowing flow of the pressurized air to open the diaphragm 1017.

FIGS. 4A, 4B further demonstrate how the pneumatic disable mechanism 1007 in this embodiment is kept in place within the hybrid valve 1000.

Figure 5A:
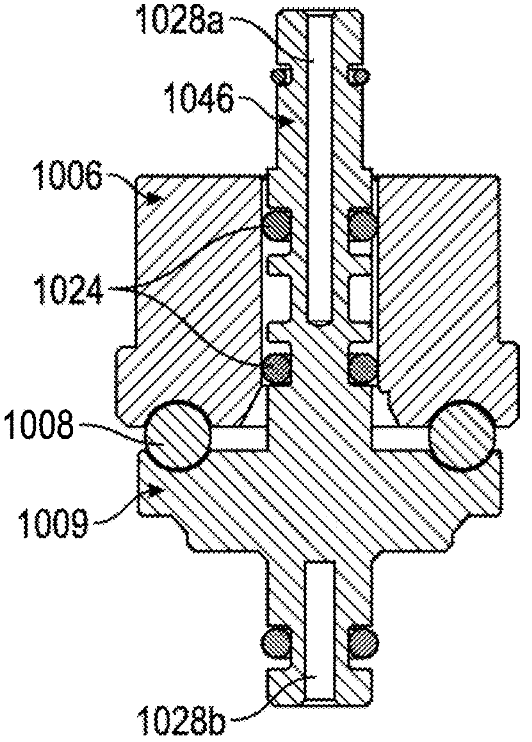
FIG. 5A provides a schematic cross sectional side view of one embodiment of the assembly. The figure focuses on illustrating the internal chambers for air flow as well as the relationship between the ball and sloped grooves. The valve is closed.
Figure 5B:
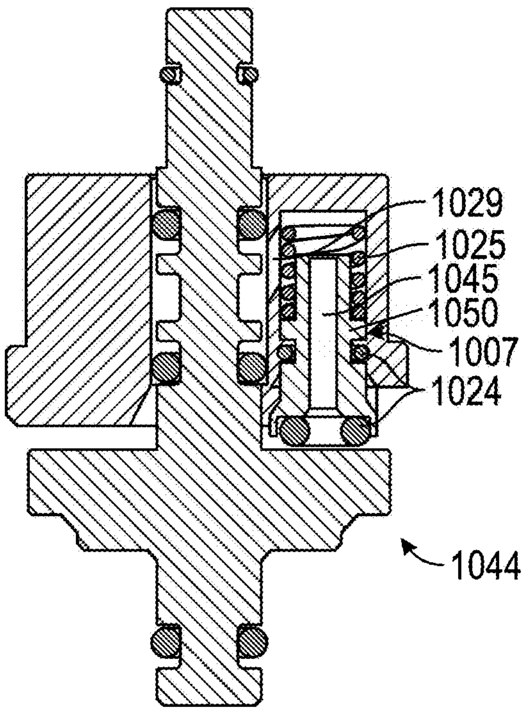
FIG. 5B provides a different schematic cross sectional side view of one embodiment of the control shaft and pneumatic disable mechanism, focusing on the sub parts of the pneumatic disable mechanism. The valve is closed.

FIGS. 5A and 5B provide a detailed and internal schematic view of the threaded stopper 1006 and the control shaft 1009 as well as the pneumatic disable mechanism 1007.

The control shaft 1009 is kept in place by the first spring 1010 underneath it. The first spring 1010 together with the second spring 1025 provide sufficient force in urging the control shaft 1009 against the threaded stopper 1006, to maintain the valve 1000 in either its disabled/closed status (FIG. 4A) or enabled/open status (FIG. 4B), as determined by the user.

Through FIGS. 4A and 4B we can further understand the flow of air through the pneumatically actuated valve 1000 and the function of the described mechanism.

The air from pneumatic means may flow into the valve's control shaft 1009 through: the air fitting inlet 1001, an intern al duct of the handle positioner 1004, and an upper control shaft duct 1028*a* of the control shaft 1009, detour through threaded stopper duct 1029, down into the pneumatic disable mechanism housing chamber 1023, through a disable mechanism duct 1045 of a disable mechanism shaft 1050 [FIG. 5B], and back into the control shaft 1009 through a lower control shaft duct 1028*b* [FIG. 4B].

FIGS. 5A and 5B show the valve 1000 in its closed state and they are an imperfect cross sections of the valves' 1000 closed state.

The control shaft 1009 and the threaded stopper 1006 are apart, no pressurized air reaches the bottom part of the valve 1000.

When the valve 1000 is in a closed state, the air escapes in the gap between the control shaft 1009 and the threaded stopper 1006.

Figure 8A:
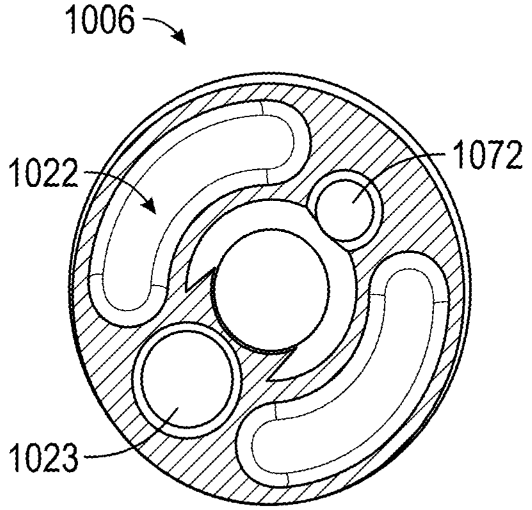
FIG. 8A provides a bottom view of the stopper.
Figure 8B:
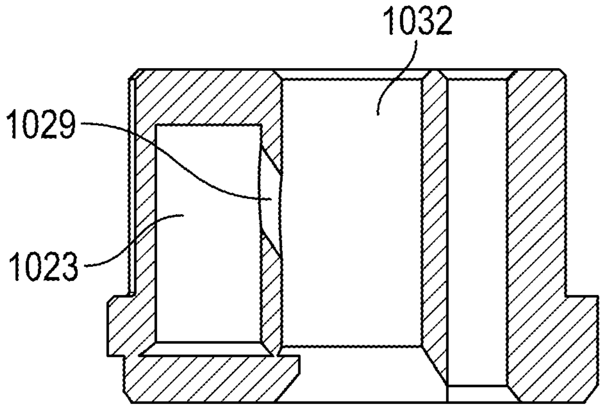
FIG. 8B provides a cross-sectional side view of the threaded stopper focusing on an angled duct for the flow of air and an orifice used for housing the pneumatic disable mechanism.

As also shown in FIGS. 8A and 8B, the housing chamber 1023 is located between the threaded stopper 1006 and the control shaft 1009 (see Figures SA, SB), and is sealed by two O-rings 1024 located in the chamber 1023 (FIGS. 8A and 8B) which snugly engage the disable mechanism shaft 1050 with the housing chamber 1023.

Figure 6:
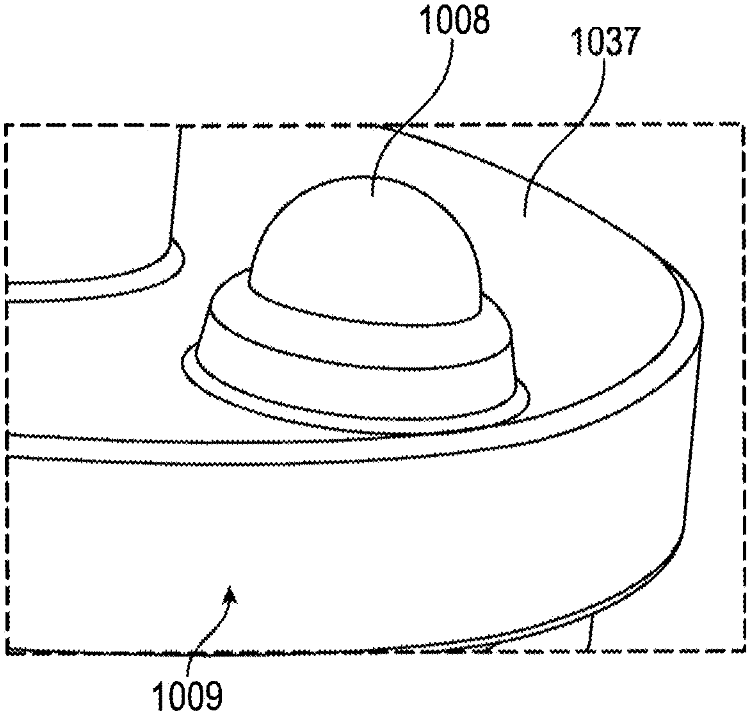
FIG. 6 provides a close-up description of a control shaft in the assembly, specifically the ball and its housing.

When the valve 1000 is in an open state, the control shaft 1009 and the threaded stopper 1006 are forced together by first spring 1010 and second spring 1025, that push the pneumatic disable mechanism shaft 1050 against a face 1037 (FIG. 6) of the control shaft 1009 so that an O-ring 1024 is firmly held against the face 1037 and essentially seals the disable duct 1045 with control shaft lower duct 1028b.

When the valve 1000 is in an open state, there is less escape of air, and the threaded stopper 1006 and the control shaft 1009 are aligned.

When the handle 1002 is slightly rotated [less than 0°] such as by an inadvertent knock, the disable mechanism duct 1045 and the lower control duct 1028b may remain partially aligned to allow flow of pressurized air therethrough, and the disable mechanism shaft 1050 and its O-ring 1024 may slide along the face 1037 (FIG. 6) of the control shaft 1009 when first rotating the handle 1002.

In order to disable the valve 1000, further rotating the handle [past 0°] 1002 further turns the control shaft 1009 such that the two bearing spheres 1008, further travel along sloped groove 1022 (FIG. 8A) and thus a gap 1070 is created between the face 1037 and the threaded stopper 1006—compare FIG. 4A to FIG. 4B. The gap 1070 does communicate with the environment outside the valve 1000. The lower duct 1028b in the control shaft 1009 does not line up with the pneumatic disable mechanism duct 1045 but rather communicates with the gap 1070, causing the air in the lower duct 1028b and in the actuator 1013 to escape into the natural environment.

In addition, since the threaded stopper 1006 is immovable in the valve 1000, the movement of the control shaft 1009 relative to the stopper 1006 translates into downward movement of the shaft, which in turn pushes down the piston 1034 and thereby pushes the diaphragm 1017 such as to mechanically close the valve 1000.

When the control shaft 1009 is rotated back about axis A to enable the valve 1000, the control shaft 1009 rises and stops pressing on the diaphragm 1017. Simultaneously the pressurized air flowing through the pneumatic disable mechanism 1007 can now flow into the aligned shaft 1009 and into the actuator 1013 as depicted in FIG. 4B, thereby together with the rise of the control shaft allowing the diaphragm 1017 to rise and the valve 1000 to open.

The four ducts 1045, 1028a, 1028b and 1029 are members of the series of ducts 1043. The valve 1000 is configured to allow the pressurized air to continue flowing to the diaphragm 1017 despite turning the handle 1002 about the axis A, and respectively turning the control shaft 1009, during the second stage; alignment of the ducts 1028a, 1028b, 1029 and 1045 is essentially maintained and leak from the series of ducts 1043 is prevented by the action of the second spring 1025 on the O-rings 1024.

Figure 7:
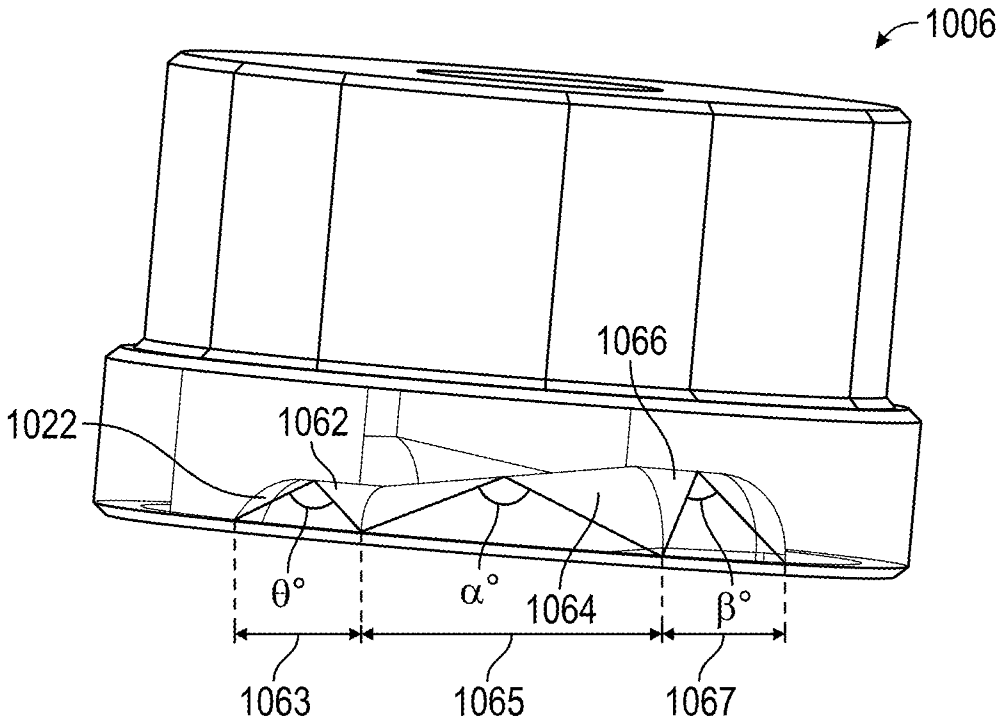
FIG. 7 is an internal illustration of a threaded stopper in the assembly, highlighting the sloped groove and the change of angles within.

The nozzle 1046 of the control shaft 1009 fits into the middle hole 1032 of the threaded stopper 1006 and the two bearing spheres 1008 fit into the sloped grooves 1022. The threaded stopper 1006 is held in position by external screws 1011, ensuring that it experiences no vertical and rotational movement. The control shaft 1009 is held in place by the first compression spring 1010, ensuring that the threaded stopper 1006 and the control shaft 1009 are engaged thereto. The control shaft 1009 can rotate around axis A as dictated by the change in angles from one end of the sloped groves 1022 (FIG. 7) to the other. The valve's state changes from disabled/closed (FIG. 4A) to enabled/open (FIG. 4B) and vice versa. The system will not change status while the bearing spheres 1008 are still in the first 1062 or third 1066 regions, as marked in FIG. 7, providing an additional safety for the user, preventing the valve 1000 from changing from a closed (FIG. 4A) to open 'status (FIG. 4B) and vice versa due to inadvertent/unintended small movements of the handle 1002.

FIGS. 6, 7 and 8A, 8B provide additional views of the control shaft 1009 and threaded stopper 1006, showing the internal duct 1029 of the threaded stopper 1006 and a hole 1032 through which part of the control shaft 1009 extends, and provides a better idea of the mechanical design of the disable mechanism 1044.

Note that below the control shaft all the parts of the valve are standard. Therefore, the novel parts may be retrofitted onto various valve bodies.

At present we believe that these embodiments operate best, but the other embodiments are also satisfactory.

An external latch 1003 is included in most embodiments of the pneumatically actuated valve 1000 as depicted in FIGS. 2-8B. It is used for locking the valve in closed state, in situations of additional needed safety for example during maintenance of the valve 1000 and/or of equipment in the vicinity of the valve 1000.

An installation hole 1072 extending through the threaded stopper 1006, and shown in Figure SA, may be used to help construct the valve 1000 or to properly retrofit the new mechanism on a commercially available valve. A screw or bold (not shown) may be inserted to help fixate the control shaft 1009 during the assembly so that it doesn't inadvertently rotate to a wrong position.

It will be appreciated that other embodiments may significantly depart from the illustrated structures and perform similar operations to the same effect, subject to the scopes of the claims, but all of these other embodiments are to the best of our knowledge presently unknown and are not commercially available.

I claim:

1. A normally closed valve comprising:
a seat that has a fluid inlet and a fluid outlet;
a diaphragm, an external handle and an internal safety mechanism operationally coupled to the external handle and the diaphragm;
wherein the valve is configured to allow forcing the handle in a first direction, thereby moving the internal safety mechanism through at least a first stage and subsequently a second stage;
wherein
during the first stage:
the diaphragm is pressed onto the seat,
flow of pressurized air through the internal safety mechanism is blocked, and
air in the valve is vented,
causing the valve to be and remain in a closed state;
during the second stage:
flow of pressurized air through the internal safety mechanism is allowed, the pressurized air after passing therethrough, acting against the pressing of the diaphragm onto the seat, and a venting of air is reduced,
causing the valve to be and remain in an open state,
wherein the valve is further configured to allow moving the internal safety mechanism through an intermediary stage, and
wherein during the intermediary stage, the valve is in the closed state;
the internal safety mechanism comprises:
a pneumatic disable mechanism, a control shaft, and a series of ducts extending through the disable mechanism and the control shaft;
wherein the moving of the internal safety mechanism comprises moving the control shaft relative to the disable mechanism;
during the second stage, the series of ducts are aligned;
the valve further comprising a threaded stopper, the stopper comprising a stopper duct and a housing chamber, the stopper duct extending through a wall of the housing chamber and being a member of the series of ducts;

wherein the disable mechanism is situated within the housing chamber;

the disable mechanism comprising:

a disable shaft comprising a disable mechanism duct;

resilient means for urging the disable mechanism against the control shaft, and sealing means for sealing in between the disable mechanism duct and the control shaft duct when the disable mechanism duct and the control shaft duct are aligned.

2. The valve according to claim 1, the threaded stopper further comprising;

at least one groove, each comprising a first region and a second region;

the internal safety mechanism comprising at least one bearing sphere, each held on the control shaft and situated in one of the at least one groove;

wherein turning the external handle causes the at least one bearing sphere to travel along the at least one groove;

when the at least one bearing sphere is in the first region the internal safety mechanism is moving through the first stage and when the at least one bearing sphere is in the second region the internal safety mechanism is moving through the second stage.

3. The valve according to claim 2, wherein the at least one groove further comprises an intermediary region;

when the at least one bearing sphere is in the intermediary region the internal safety mechanism is moving through the intermediary stage.

4. The valve of claim 1, wherein the valve is further configured to allow forcing the handle in a second direction opposite to the first direction, thereby moving the internal safety mechanism through at least the second stage and subsequently the first stage.

5. The valve of claim 4, further comprising a piston mechanically coupling the internal safety mechanism to the diaphragm; wherein during the first stage the internal safety mechanism pushes the piston against the diaphragm.

6. The valve of claim 1, further comprising a piston mechanically coupling the internal safety mechanism to the diaphragm; wherein during the first stage the internal safety mechanism pushes the piston against the diaphragm.

* * * * *